US008508907B2

(12) United States Patent
Mayer

(10) Patent No.: US 8,508,907 B2
(45) Date of Patent: Aug. 13, 2013

(54) METHOD AND DEVICE FOR COLLECTING ELECTROSTATIC CHARGE FROM THE ATMOSPHERE

(75) Inventor: Robert Mayer, Manassas, VA (US)

(73) Assignee: eFluxor LLC, Manassas, VA (US)

( * ) Notice: Subject to any disclaimer, the term of this patent is extended or adjusted under 35 U.S.C. 154(b) by 299 days.

(21) Appl. No.: 12/976,015

(22) Filed: Dec. 22, 2010

(65) Prior Publication Data

US 2012/0106023 A1 May 3, 2012

Related U.S. Application Data

(60) Provisional application No. 61/408,973, filed on Nov. 1, 2010.

(51) Int. Cl.

*H05F 3/00* (2006.01)
*H02N 1/00* (2006.01)
*H02N 1/04* (2006.01)

(52) U.S. Cl.

USPC ............ 361/221; 361/231; 310/309; 310/310

(58) Field of Classification Search

USPC .......................... 361/221, 231; 310/309, 310
See application file for complete search history.

(56) References Cited

U.S. PATENT DOCUMENTS

| | | | | |
|---|---|---|---|---|
| 2,644,903 | A * | 7/1953 | Lehrer | 310/309 |
| 2,649,566 | A * | 8/1953 | Morel | 322/2 A |
| 3,514,644 | A | 5/1970 | Fonberg | |
| 3,600,632 | A | 8/1971 | Bright | |
| 3,614,481 | A | 10/1971 | Halliday | |
| 3,857,066 | A | 12/1974 | Cline | |
| 3,870,933 | A | 3/1975 | Huber | |
| 4,048,667 | A | 9/1977 | Brennecke | |
| 5,248,930 | A | 9/1993 | Taylor | |
| 5,506,491 | A | 4/1996 | Ford | |
| 5,592,357 | A | 1/1997 | Rader | |
| 5,923,130 | A | 7/1999 | Roman | |
| 6,498,291 | B2 | 12/2002 | Brammer | |
| 2005/0040731 | A1 | 2/2005 | Schmidt | |
| 2006/0284004 | A1 | 12/2006 | Jones | |
| 2008/0042862 | A1 | 2/2008 | Chen | |
| 2009/0158537 | A1 | 6/2009 | Ishijima | |
| 2010/0007218 | A1 | 1/2010 | Ogram | |
| 2010/0008011 | A1 | 1/2010 | Ogram | |

* cited by examiner

*Primary Examiner* — Scott Bauer
(74) *Attorney, Agent, or Firm* — eFluxor LLC; Robert A. Mayer

(57) ABSTRACT

A device collects electrostatic charge from the atmosphere and stores the electrostatic charge for further use. The device includes a primary array including a plurality of electrically-conducting collectors, a plurality of electrically-conducting inductors, a charge regulator, and a charge storage device. A secondary array can be added to improve the efficiency of the primary array.

6 Claims, 2 Drawing Sheets

METHOD AND DEVICE FOR COLLECTING ELECTROSTATIC CHARGE FROM THE ATMOSPHERE

CROSS-REFERENCE TO RELATED APPLICATIONS

This application claims the benefit of Provisional Application No. 61/408,973 filed Nov. 1, 2010, the contents of which are incorporated herein by reference.

BACKGROUND OF THE INVENTION

The present invention generally relates to a method and apparatus for collecting excess electrostatic charge from the environment. More specifically, the present invention relates to a method and apparatus for collecting excess electrostatic charge from the environment and storing the electrostatic charge for dispersal or further use.

The buildup of static electricity frequently occurs in many different natural and commercial environments. People and objects may build up a high voltage charge. In addition, the air may acquire an undesirable charge. Unfortunately, when a person gets close to another person and/or an object, the difference in the voltage charge produces an undesirable discharge in the form of a spark. Sparks may be lethal to individuals and sensitive machines in some industrial environments.

Current devices for electrostatic charge collection typically rely on electrically-powered systems which operate at high voltages and are ineffective in actually collecting ion charges for controlled dispersal.

As can be seen, there is a need to provide a reliable device for electrostatic charge collection that operates at low voltage.

SUMMARY OF THE INVENTION

In one aspect of the present invention, a device for collecting electrostatic charge includes an array having a plurality of electrically-conducting collectors to collect the electrostatic charge, a plurality of electrically-conducting inductors electrically coupled to the electrically-conducting collectors, a charge regulator coupled to the electrically-conducting inductors, a charge storage device coupled to the charge regulator, a plurality of brushes for transferring collected electrostatic charge from the electrically-conducting collectors to the charge storage device; and a plurality of charge equalization wires coupled to the plurality of brushes.

In another aspect of the present invention, a second collector/inductor assembly can be connected to the first collector/inductor assembly, where each assembly includes an array having a plurality of electrically-conducting collectors to collect the electrostatic charge, a plurality of electrically-conducting inductors electrically coupled to the electrically-conducting collectors, a plurality of brushes for transferring collected electrostatic charge from the electrically-conducting collectors to the charge storage device; and a plurality of charge equalization wires coupled to the plurality of brushes.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a rotating device for collecting electrostatic charge from the atmosphere and storing the electrostatic charge for dispersal or further use.

Figure 1:
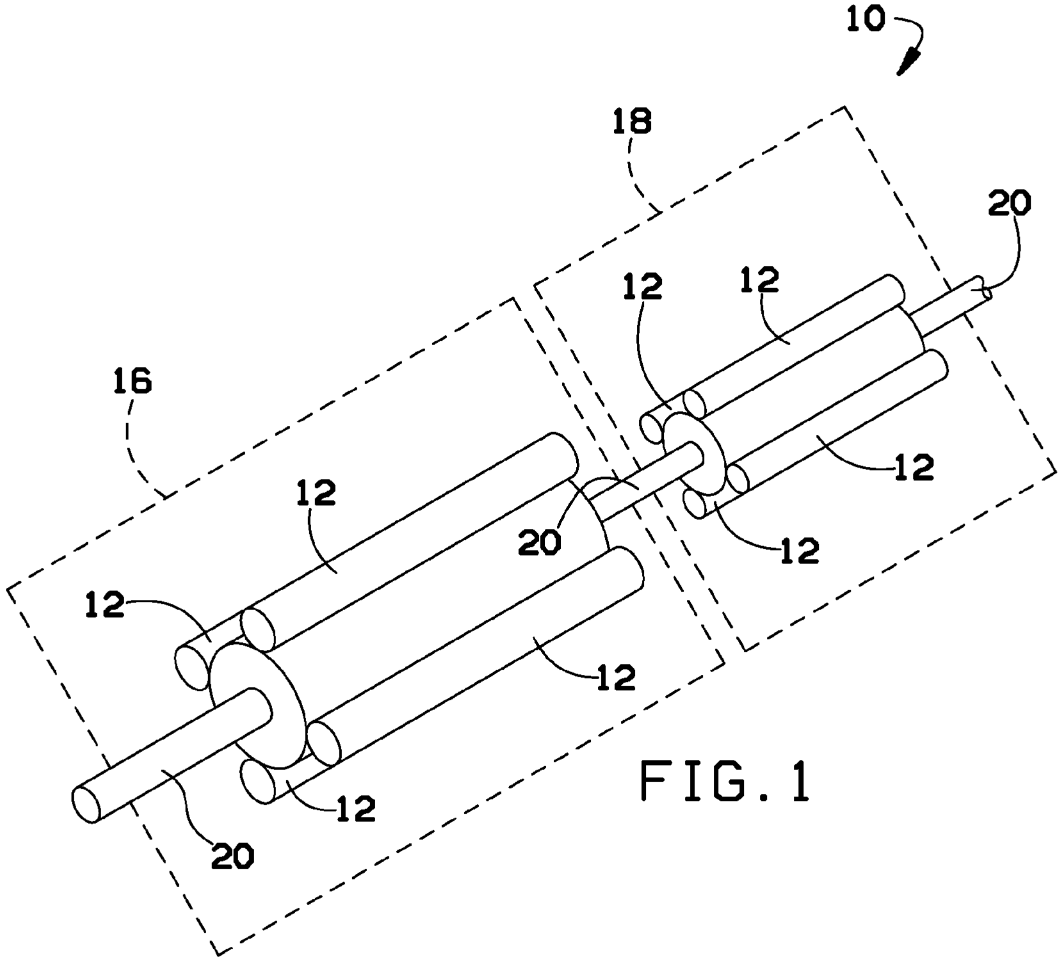
FIG. 1 illustrates a perspective front view of a device for collecting electrostatic charge from the atmosphere according to an exemplary embodiment of the present invention showing a primary assembly and a secondary assembly.
Figure 2:
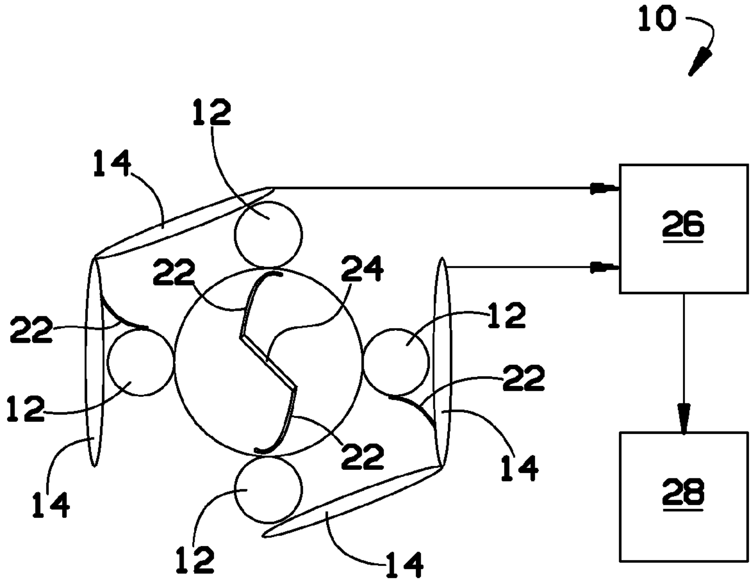
FIG. 2 illustrates a perspective top view of a device for collecting electrostatic charge from the atmosphere according to another exemplary embodiment of the present invention.
Figure 3:
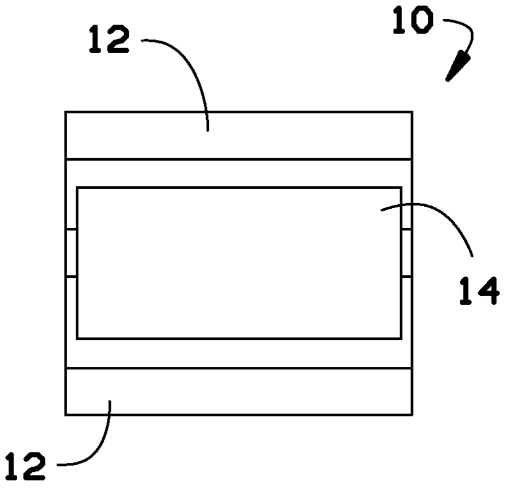
FIG. 3 illustrates a side view of the device of FIG. 2.
Figure 4:
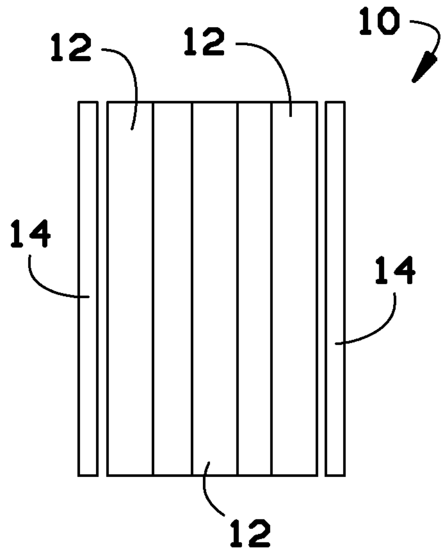
FIG. 4 illustrates a top view of the device of FIG. 2.

FIGS. 1 and 2 illustrates the device 10 for collecting electrostatic charge including an array having a plurality of electrically-conducting collectors 12 to collect the electrostatic charge, a plurality of electrically-conducting inductors 14 electrically coupled to the electrically-conducting collectors 12, a charge regulator 26 coupled to the electrically-conducting inductors 14, a charge storage device 28 coupled to the charge regulator 26, a plurality of brushes 22 for transferring collected electrostatic charge from the electrically-conducting collectors 12 to the charge storage device 28; and a plurality of charge equalization wires 24 coupled to the plurality of brushes 22.

FIG. 1 illustrates an alternative embodiment of the present invention in which the device 10 may include a primary collector/inductor assembly 16 and a secondary collector/inductor assembly 18 mounted on a common shaft 20. In one embodiment, the primary collector/inductor assembly 16 and secondary collector/inductor assemblies 18 may be directly connected by using rotational bearing assemblies attached to each end of the primary collector/inductor assembly 16 and the secondary collector/inductor assembly 18.

The collectors 12 may have different shapes. In one embodiment, the collectors 12 may have a cylindrical, rectangular, pyramidal, planar, or elongated shape. The collectors 12 may be placed parallel to each other and arranged at approximately equal distances from an axis of rotation of their aggregate collector/inductor assemblies 16 and 18. In one embodiment, the collectors 12 may be made of metal, composites, alloys, graphite, or any other conductive materials. The collectors 12 may have a solid body or a hollow body.

The exemplary invention embodiment shown as device 10 may include a plurality of inductors 14. The inductors 14 may be operatively connected to the collectors 12 to extract charged ions from the ambient environment. In one embodiment, the inductors 14 may have a length greater than twice the radius of rotation of the rotating array with the plurality of conductors 12.

The charge regulator 26 may be a standard commercially-available charge regulator. In one embodiment, the charge regulator 26 may be a spark gap. The charge regulator 26 may include electrical components that limit the voltage build-up in the rotating device 10 and the charge storage device 28.

A plurality of brushes or brush equivalents 22 may be used to transfer accumulated charges between the collectors 12 and inductors 14 during the operation of the device 10. The number of brushes 22 may be determined by the implemented configuration. In one embodiment, the device 10 may include four brushes 22.

The charge equalization wire 24 may momentarily connect two of the collectors 12 under the influence of two inductors 14. This wire may allow the transfer of charge between oppositely-charged collectors 12 at appropriate times in the collector assembly 16 during the operation of the device 10.

When the collector 12 and inductor 14 assemblies of the device 10 are counter-rotated relative to each other by any appropriate means, the ion extraction process may be a normal result of the rotation of the device 10. The collection and removal of the charge may be achieved by the unique combination of accepted electrostatic engineering principles and the new component configuration to create an electrostatic collection system which may be capable of low-voltage electrostatic ion collection capabilities.

The device 10 may be placed in a selected environment which contains excess electrostatic charge. The operation of the device 10 may be initiated by applying mechanically rotational power to the collector and/or inductor assemblies 12 to initiate the charge collection process, which continues until the rotation stops. The resulting operation may cause a transfer of the excess charge to the charge storage device 28 where it can be immediately dispersed and/or collected.

The elements of the device 10 may be in a number of different configurations which may operate at different efficiencies. The size, shape, physical relationships, and materials employed may be configured to have an apparently different appearance when actually they are alternative implementations of this invention.

The device 10 adapted to rotate for collecting electrostatic charge may be considered to be based on classic electrostatic accumulation principles, but is configured to operate at significantly lower voltages, thus requiring fewer operating components. These improvements may allow major simplifications in the construction and maintenance of the device 10 and its associated systems, reducing initial production costs, operational power requirements, and ongoing maintenance costs.

The present invention has been successfully demonstrated at the bench-scale level.

It should be understood, of course, that the foregoing relates to exemplary embodiments of the invention and that modifications may be made without departing from the spirit and scope of the invention as set forth in the following claims.

I claim:

1. A device for collecting electrostatic charge comprising:

a primary assembly, wherein the primary assembly includes;

an array having a plurality of electrically-conducting collectors to collect the electrostatic charge;

a plurality of electrically-conducting inductors electrically coupled to the electrically-conducting collectors;

a primary charge regulator coupled to the primary assembly electrically-conducting collectors;

a charge storage device coupled to the charge regulator;

a plurality of brushes for transferring collected electrostatic charge from the electrically-conducting collectors to a charge storage device; and a plurality of primary assembly charge equalization wires coupled to the plurality of primary assembly brushes; and a secondary assembly electrically connected to the primary assembly, wherein the secondary assembly includes:

an array having a plurality of secondary assembly electrically-conducting collectors to collect electrostatic charge;

a plurality of secondary assembly electrically-conducting inductors electrically coupled to the secondary assembly electrically-conducting collectors;

a secondary charge regulator electrically coupled to the secondary assembly electrically-conducting collectors and the primary assembly electrically-conducting collectors;

a plurality of brushes for transferring collected electrostatic charge from the secondary assembly electrically-conducting inductors to the secondary assembly electrically-conducting collectors; and a plurality of secondary assembly charge equalization wires coupled to the plurality of secondary assembly brushes.

2. The device according to claim 1, wherein the sizes of the primary and secondary assemblies are different from each other.

3. The device according to claim 1, wherein the primary and secondary assemblies are mounted and rotated on the same shaft.

4. The device according to claim 1, wherein the primary and secondary assemblies are mounted and rotated on separate shafts.

5. The device according to claim 1, wherein the primary assembly collector array and the secondary assembly collector array do not rotate.

6. The device according to claim 1, wherein the primary assembly inductor array and the secondary assembly inductor array rotate.

* * * * *